(12) United States Patent
Mori (10) Patent No.: US 9,982,726 B2
(45) Date of Patent: May 29, 2018

(54) ONE-WAY CLUTCH DEVICE (71) Applicant: NSK LTD., Tokyo (JP)

(72) Inventor: Hirofumi Mori, Kanagawa (JP)

(73) Assignee: NSK LTD (JP)

(*) Notice: Subject to any disclaimer, the term of this patent is extended or adjusted under 35 U.S.C. 154(b) by 438 days.

(21) Appl. No.: 14/771,950

(22) PCT Filed: Mar. 25, 2014

(86) PCT No.: PCT/JP2014/058338
§ 371 (c)(1),
(2) Date: Sep. 1, 2015

(87) PCT Pub. No.: WO2014/157236
PCT Pub. Date: Oct. 2, 2014

(65) Prior Publication Data
US 2016/0010705 A1    Jan. 14, 2016

(30) Foreign Application Priority Data

Mar. 26, 2013 (JP) .................................. 2013-063156
Mar. 26, 2013 (JP) .................................. 2013-063265

(51) Int. Cl.
*F16D 41/064* (2006.01)
*F16D 41/067* (2006.01)

(52) U.S. Cl.
CPC .......... *F16D 41/064* (2013.01); *F16D 41/067* (2013.01)

(58) Field of Classification Search
USPC ................................................... 192/45.006
See application file for complete search history.

(56) References Cited

U.S. PATENT DOCUMENTS 3,548,982 A * 12/1970 Georgy ................. F16D 41/067
                                                     192/45.006
5,617,937 A    4/1997 Zettner et al.
(Continued)

FOREIGN PATENT DOCUMENTS

JP    09-151964    5/1997
JP    11-230315    8/1999
(Continued)

OTHER PUBLICATIONS

International Search Report for PCT/JP2014/058338 dated Jun. 2, 2014.

*Primary Examiner* — Colby M Hansen
(74) *Attorney, Agent, or Firm* — Hartman Global IP Law; Gary M. Hartman; Domenica N. S. Hartman (57) ABSTRACT

Means for restricting the axial displacement of a clutch retainer (11a) with respect to a metal inner ring (3a) is configured so that the amount of processing of the inner ring (3a) is reduced. Semispherical concave engaging sections (22) are formed in the cam surface (6) of the inner ring (3a), and semispherical convex engaging sections (23) are formed on the inner-circumferential surface of a rim section (12b) of the clutch retainer (11a). The means for restricting the axial displacement of a clutch retainer (11a) with respect to a metal inner ring (3a) is achieved by engagement between the concave engaging sections (22) and the convex engaging sections (23) when the clutch retainer (11a) is assembled on the outer-diameter side of the cam surface (6).

5 Claims, 8 Drawing Sheets (56) References Cited

U.S. PATENT DOCUMENTS

| | | | | |
|---|---|---|---|---|
| 6,237,736 B1* | 5/2001 | Ouchi | ............... | F16D 41/064 |
| | | | | 192/41 R |
| 6,488,135 B1* | 12/2002 | Kinoshita | ............ | F16D 41/067 |
| | | | | 192/110 B |
| 2001/0045334 A1* | 11/2001 | Aida | ................ | F16D 41/067 |
| | | | | 192/45.017 |
| 2004/0200684 A1* | 10/2004 | Aida | ................ | F16D 41/067 |
| | | | | 192/45.006 |

FOREIGN PATENT DOCUMENTS

| | | |
|---|---|---|
| JP | 2000-104758 | 4/2000 |
| JP | 2000-213566 | 8/2000 |
| JP | 2001-165201 | 6/2001 |
| JP | 2007-064348 | 3/2007 |
| JP | 2008-008349 | 1/2008 |

* cited by examiner

ONE-WAY CLUTCH DEVICE

TECHNICAL FIELD

The present invention relates to a one-way clutch that makes it possible to transmit rotational force between two members that are combined so as to be concentric to each other only when the two members relatively rotate in a specified direction.

BACKGROUND ART

One-way clutches that only transmit rotation motion in a specified direction are assembled in the rotation transmission portion of various kinds of mechanical devices such as a starter for an idling-stop vehicle, various kinds of auxiliary devices for an automobile such as an alternator and the like, an oil pump for a transmission, and the like. Moreover, as disclosed in Japanese Patent No. 3,657,330, a one-way clutch and a rolling bearing may be made into a unit by using common parts. An example of such a one-way clutch device will be explained with reference to FIG. 8 and FIG. 9. In this one-way clutch device, a one-way roller clutch 1, and a pair of cylindrical roller bearings 2a, 2b that are arranged so as to be adjacent to both sides in the axial direction of the roller clutch 1 are made into a unit by using a common inner ring 3.

The inner ring 3 is made using metal plate, and comprises a cylindrical section 4, and a pair of outward-facing rim sections 5a, 5b that are formed by bending both end sections in the axial direction of the cylindrical section 4 outward in the radial direction. A cam surface 6 is provided in the middle section in the axial direction of the outer-circumferential surface of the cylindrical section 4 as an inner-diameter-side engaging surface of the roller clutch 1, and a pair of cylindrical inner raceways 7a, 7b of a pair of cylindrical roller bearings 2a, 2b are provided on both end sections in the axial direction of the cylindrical section 4. Plural concave cam sections 8 called ramp sections are formed on the cam surface 6 so as to be uniformly spaced in the circumferential direction. The depth of each of these concave cam sections 8 becomes larger going in a direction toward one side in the circumferential direction. Moreover, of the pair of inner raceways 7a, 7b, the outer diameter of one of the inner raceways 7a located on one side in the axial direction (left side in FIG. 8 and FIG. 9) is equal to or greater than the diameter of the circumscribed circle of the cam surface 6. On the other hand, the outer diameter of the other inner raceway 7b located on the other side in the axial direction (right side in FIG. 8 and FIG. 9) is equal to or less than the diameter of the inscribed circle of the bottom of the groove of the concave cam sections 8. Therefore, of the edges on both ends in the axial direction of these concave cam sections 8, the edges on one end in the axial direction, which are the edges of the ends on one side in the axial direction of the concave cam sections 8, are covered by stepped surfaces 9 and are not open in the axial direction. On the other hand, the edges of the other ends in the axial direction, which are the edges of the ends on the other side in the axial direction of the concave cam sections 8, are open in the axial direction.

Figure 8:
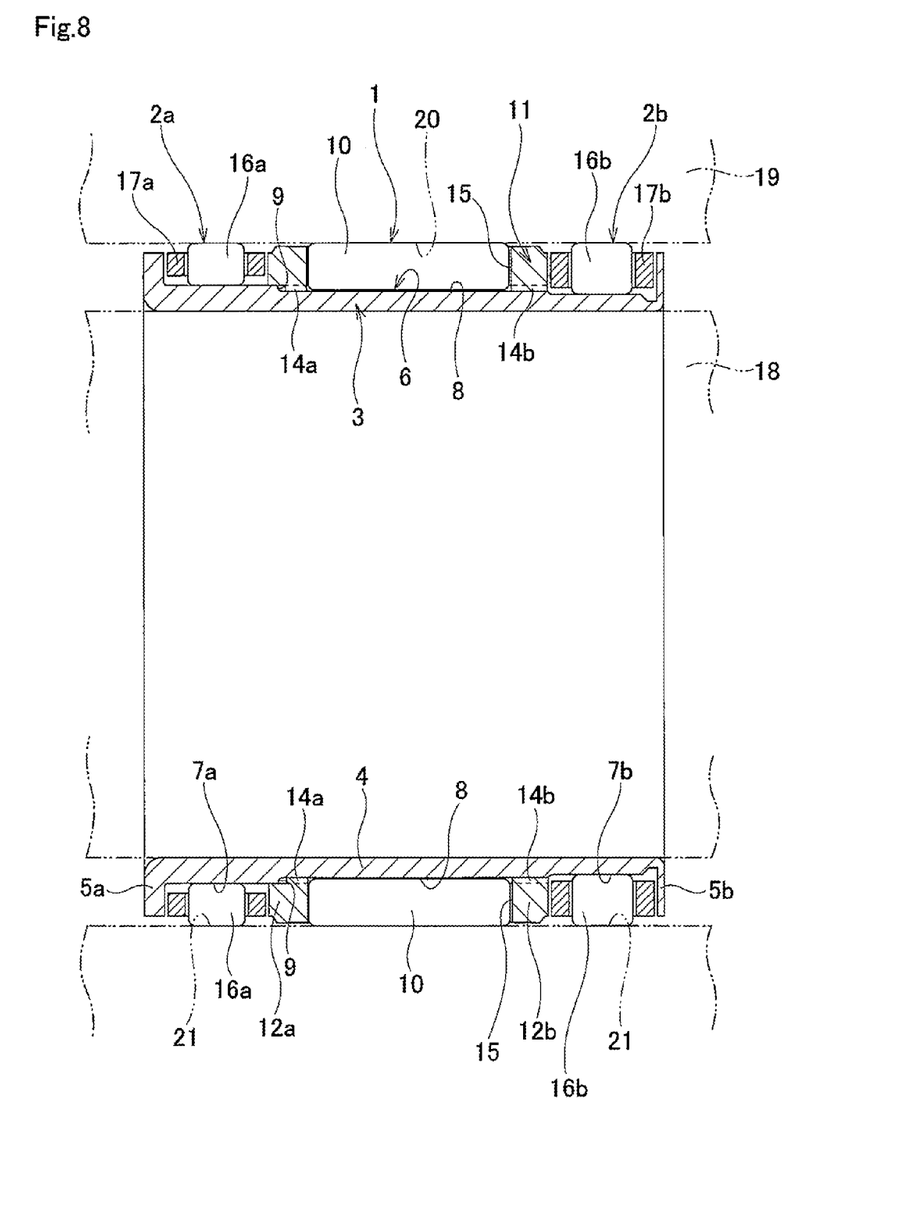
FIG. 8 is a cross-sectional view illustrating an example of a one-way clutch having conventional construction.
Figure 9:
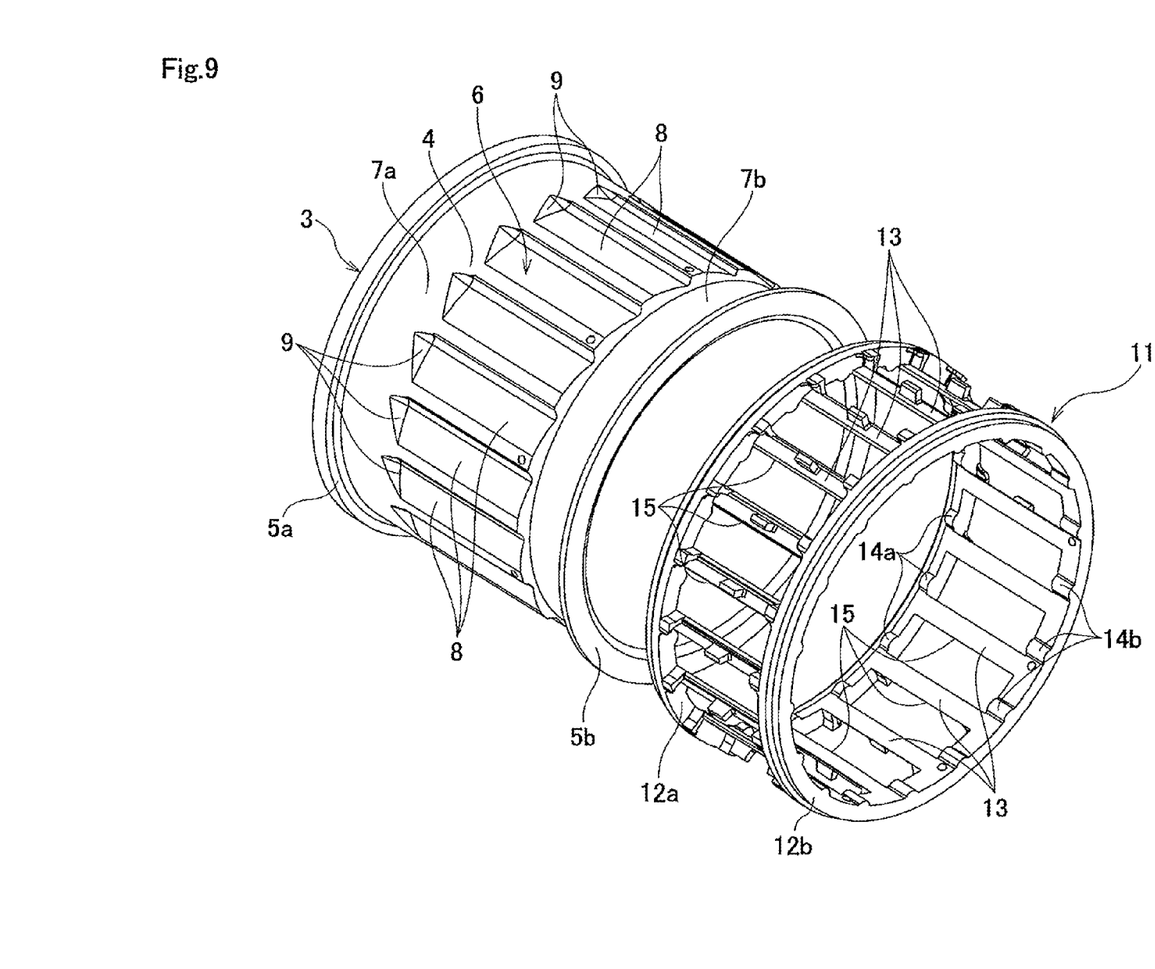
FIG. 9 is an exploded perspective view of an inner ring and clutch retainer of the one-way clutch device in FIG. 8.

Plural rollers 10, which are engaging elements of the roller clutch 1, a clutch retainer 11, and plural springs (not illustrated in the figures) are arranged on the outer-diameter side of the cam surface 6. The rollers 10 are made using a metal. The rollers 10 are held by the clutch retainer 11, and in a held state, are arranged so that there is one roller 10 on the outer-diameter side of each concave cam section 8. On the other hand, the clutch retainer 11 is made using a synthetic resin and formed into a cylindrical shape. The clutch retainer 11 has: a pair of ring-shaped rim sections 12a, 12b that are separated from each other in the axial direction and arranged so as to be concentric with each other; plural column sections 13 that span between the rim sections 12a, 12b and are arranged so as to be uniformly spaced in the circumferential direction; and protrusions 14a, 14b that are provided at plural locations in the circumferential direction of the inner-circumferential surfaces of the rim sections 12a, 12b. Pockets 15 for holding the rollers 10 so as to be able to roll freely and so as to be able to move a little in the circumferential direction are formed in portions that are surrounded on four sides by the pair of rim sections 12a, 12b and column sections 13 that are adjacent in the circumferential direction. The clutch retainer 11 is prevented from rotating with respect to the inner ring 3 by the protrusions 14a, 14b engaging with the concave cam sections 8. The springs are provided between the column sections 13 and the rollers 10, and elastically press the rollers 10 in a direction in which the depth of the concave cam sections 8 becomes smaller going in the circumferential direction.

Plural cylindrical rollers 16a, 16b of the cylindrical roller bearings 2a, 2b, and cylindrical bearing retainers 17a, 17b that hold these rollers 16a, 16b so as to be able to roll freely are arranged on the outer-diameter side of the pair of inner raceways 7a, 7b. The cylindrical rollers 16a, 16b are made using a metal, and the bearing retainers 17a, 17b are made using a metal or a synthetic resin. Of the pair of outward-facing flange sections 5a, 5b of the inner ring 3, the outward-facing flange section 5a that is located on one side in the axial direction is formed before the other components are arranged around the cylindrical section 4, so has a thickness dimension that is equal to the portion of the cylindrical section 4 where one adjacent inner raceway 7a is provided. On the other hand, the other outward-facing flange section 5b that is located on the other side in the axial direction is formed after the other components (at least the clutch retainer 1 and bearing retainers 17a, 17b) are arranged around the cylindrical section 4, so the thickness is thinner than the portion of the cylindrical section 4 where the other adjacent inner raceway 7a is provided.

When using this kind of one-way clutch device, the inner ring 3 is fastened around the outside of an inner-diameter side member 18 such as a rotating shaft. Moreover, an outer-diameter side member 19 such as a housing, pulley and the like is assembled on the outer-diameter side of the rollers 10 and cylindrical rollers 16a, 16b. Of the outer-diameter-side member 19 or another member such as an outer ring that is fitted and fastened on the inside of the outer-diameter-side member 19, a cylindrical surface 20, which is an outer-diameter side engaging surface, is provided on the portion of the inner-circumferential surface that faces the rollers 10, and a cylindrical outer raceway 21 is provided in the portion that faces the cylindrical rollers 16a, 16b. The cylindrical roller bearings 2a, 2b support radial loads that act between the inner-diameter side member 18 and the outer-diameter-side member 19, and relative rotation between the inner-diameter-side member 18 and outer-diameter-side member 19 is possible. On the other hand, the roller clutch 1 is able to transmit rotational force between the inner-diameter-side member and outer-diameter-side member 19 only when the inner-diameter-side member and the outer-diameter-side member 19 relatively rotate in a specified direction.

In other words, when the inner-diameter-side member 18 and the outer-diameter-side member 19 relatively rotate in a specified direction, the rollers 10 become wedged in the cylindrical space between the cam surface 6 and cylindrical surface 20 in the portions where the depth of the concave cam sections 8 becomes small. As a result, a locked state occurs in which transmission of rotational force between the small-diameter-side member 18 and large-diameter-side member 19 is possible. On the other hand, when the inner-diameter-side member 18 and the outer-diameter-side member 19 relatively rotate in the opposite direction of the specified direction, the inner-diameter-side member 18 and the outer-diameter-side member 19 are set into an overrun state and rotational force cannot be transmitted between these members.

In the case of this kind of one-way clutch device, the edges on one end in the axial direction of the concave cam sections 8 are covered by step surfaces 9. Therefore, the step surfaces 9 and the protrusions 14a that are provided on the inner-circumferential surface of one end in the axial direction of the clutch retainer 11 (left end section in FIG. 8 and FIG. 9) engage in the axial direction. The engagement between the step surfaces 9 and the protrusions 14a restricts displacement to one side in the axial direction of the clutch retainer 11 with respect to the inner ring 3. Due to this restriction, the clutch retainer 11 is prevented from displacing a large amount to one side in the axial direction during operation in the overrun state, and the retainer 17a of one roller bearing 2a is prevented from becoming strongly sandwiched between the clutch retainer 11 and one outward-facing flange section 5a.

On the other hand, there are no step surfaces on the edges of the other end in the axial direction of the concave cam sections 8 that the protrusions 14b that are provided on the inner-circumferential surface of the other end section in the axial direction of the clutch retainer 11 (right end sections in FIG. 8 and FIG. 9) are able to engage with. Therefore, it is not possible to restrict displacement to the other side in the axial direction of the clutch retainer 11 with respect to the inner ring 3 by using the protrusions 14b. Consequently, the clutch retainer 11 moves a large amount toward the other side in the axial direction, and there is a possibility that the bearing retainer 17b of the other roller bearing 2b will become strongly sandwiched between the clutch retainer 11 and the other outward-facing flange section 5b. When the bearing retainer 17b becomes strongly sandwiched, the bearing retainer 17b is not able to rotate with respect to the inner ring 3, and there is a possibility that the overrun state will not be able to be maintained. Furthermore, when assembling the one-way clutch device, there is a possibility that the clutch retainer 11 that is assembled on the outer-diameter side of the inner ring 3 in the stage before forming the other outward-facing flange section 5b will accidentally come out from the outer-diameter side of the inner ring 3 toward the other side in the axial direction. Therefore, the work of forming the other outward-facing flange section 5b must be performed while paying careful attention that the clutch retainer 11 does not come out, so this work becomes troublesome.

RELATED LITERATURE

Patent Literature

[Patent Literature 1] Japanese Patent No. 3,657,330

SUMMARY OF INVENTION

Problem to be Solved by Invention

In order to eliminate the problems described above, there is a need to provide means for restricting the displacement in the one-way clutch of the clutch retainer toward the other side in the axial direction with respect to the inner ring. However, because of the necessity of keeping down manufacturing costs, it is necessary to keep the amount of additional processing of the inner ring to a minimum.

In consideration of the situation described above, the object of the present invention is to achieve construction of a one-way clutch device wherein the amount of additional processing to the inner ring is kept to a minimum, and that has means for restricting the displacement of a synthetic resin clutch retainer in the axial direction with respect to a metal inner ring.

Means for Solving Problems

The one-way clutch of the present invention comprises:
an inner ring that is made of metal and comprising an outer-circumferential surface, and an inner-diameter-side engaging surface that is formed on part in the axial direction of the outer-circumferential surface;
plural engaging elements that are located around the perimeter of the inner-diameter-side engaging surface; and
a clutch retainer that is made of synthetic resin and having an overall cylindrical shape, and that, when holding the plural engaging elements, is located around the perimeter of the inner-diameter-side engaging surface.

Particularly, in the one-way clutch device of the present invention, means are provided between the inner ring and the clutch retainer for restricting displacement in the axial direction of the clutch retainer with respect to the inner ring.

More specifically, the means for restricting the displacement in the axial direction of the clutch retainer comprises: concave engaging sections that are formed on the outer-circumferential surface of the inner ring, have a circular shape as seen in the radial direction, and have a concave inner surface; and convex engaging sections that are formed on the inner-circumferential surface of the clutch retainer, and have a shape engageable with the concave engaging sections; and by the concave engaging sections engaging with the convex engaging sections, the displacement in the axial direction of the clutch retainer is prevented. Preferably, the concave engaging sections are semispherical concave sections.

Alternatively or additionally, the means for restricting the displacement in the axial direction of the clutch retainer comprises a ring-shaped member that is fitted and fastened around the outside of the inner ring with an interference fit at a position that is adjacent to and faces at least one end surface of both end surfaces in the axial direction of the clutch retainer; and by at least one end surface of the clutch retainer engaging with the ring-shaped member, the displacement in the axial direction of the clutch retainer is prevented.

The present invention is suitably applied to a one-way clutch device having construction as described below. In other words, the inner-diameter-side engaging surface comprises a cam surface on the outer-circumferential surface of the inner ring in which plural concave cam sections are formed so as to be uniformly spaced in the circumferential direction. The engaging elements comprise plural rollers that are arranged so that one roller is located on the outer-diameter side of each concave cam section. The clutch retainer comprises: a pair of ring-shaped rim sections that are separated in the axial direction and arranged so as to be concentric with each other; plural column sections that span between the pair of rim sections and are arranged so as to be spaced apart in the circumferential direction, and plural pockets that are formed in portions that are surrounded on four sides by the pair of rim sections and column sections of the plural column sections that are adjacent in the circumferential direction, and that hold the engaging elements.

When the means for restricting the displacement in the axial direction of the clutch retainer is constructed by the concave engaging sections and the convex engaging sections, preferably, the concave engaging sections are formed in portions of the cam surface that are between concave cam sections of the plural concave cam section that are adjacent in the circumferential direction. Moreover, preferably the convex engaging sections are formed on the inner-circumferential surface of at least one rim section of the pair of rim sections.

Furthermore, in the one-way clutch device to which the present invention is applied, preferably the inner ring comprises a cylindrical section that comprises the outer-circumferential surface, and an outward-facing flange section that is provided on at least one end section of both end sections in the axial direction of the cylindrical section; the inner-diameter-side engaging surface is provided in the middle section in the axial direction of the cylindrical section; a pair of inner raceways are provided on both end sections in the axial direction of the cylindrical section on both sides of the inner-diameter-side engaging surface of the outer-circumferential surface; and plural rollers and cylindrical bearing retainers that hold the rollers are arranged on the outer-diameter side of the pair of inner raceways.

Effect of Invention

With the one-way clutch of the present invention, it is possible to restrict displacement in the axial direction of a clutch retainer with respect to an inner ring due to engagement between concave engaging sections that are formed on the outer-circumferential surface of a metal inner ring and convex engaging sections that are formed in the inner-circumferential surface of a synthetic resin clutch retainer, or due to engagement between a clutch retainer and a ring-shaped member. Therefore, the clutch retainer that is assembled on the outer-diameter side of the inner ring is prevented from accidentally coming out in the axial direction during assembly work. Furthermore, during operating in the overrun state, the occurrence of a situation of not being able to suitably maintain the overrun state of the one-way clutch due to the clutch retainer coming in strong contact with bearing retainers that are arranged so as to be adjacent in the axial direction is prevented.

MODES FOR CARRYING OUT INVENTION

First Example

FIG. 1 to FIG. 5 illustrate a first example of an embodiment of the present invention. Basically, the one-way clutch device of this example, as in the conventional example, has an inner ring 3, plural rollers 10 as plural engaging elements, and a clutch retainer 11a. The inner ring 3 has a cylindrical section 4, and a pair of outward-facing flange sections 7a, 7b that are provided on both end sections in the axial direction of the cylindrical section 4. A cam surface 6, which is an inner-diameter-side engaging surface of a roller clutch 1, is provided in the middle section in the axial direction of the outer-circumferential surface of the cylindrical section 4. Plural concave cam sections 8 are formed in the cam surface 6 so as to be uniformly spaced in the circumferential direction, and so that the depth of the concave cam sections 8 becomes greater going toward one side in the circumferential direction. Moreover, a pair of cylindrical inner raceways 7a, 7b of a pair of cylindrical roller bearings 2a, 2b are provided on both sides of the cam surface 6 on both end sections in the axial direction of the outer-circumferential surface of the cylindrical section 4. The outer diameter of one of the inner raceways 7a that is located on one side in the axial direction (left side in FIG. 1 and FIG. 2) is equal to or greater than the diameter of the circumscribed circle of the cam surface 6, and the outer diameter of the other inner raceway 7b that is located on the other side in the axial direction (right side in FIG. 1 and FIG. 2) is equal to or less than the diameter of the inscribed circle of the groove bottom of the concave cam sections 8. Plural cylindrical rollers 16a, 16b, and cylindrical bearing retainers 17a, 17b that hold the cylindrical rollers 16a, 16b are arranged on the outer-diameter side of the pair of inner raceways 7a, 7b.

Figure 1:
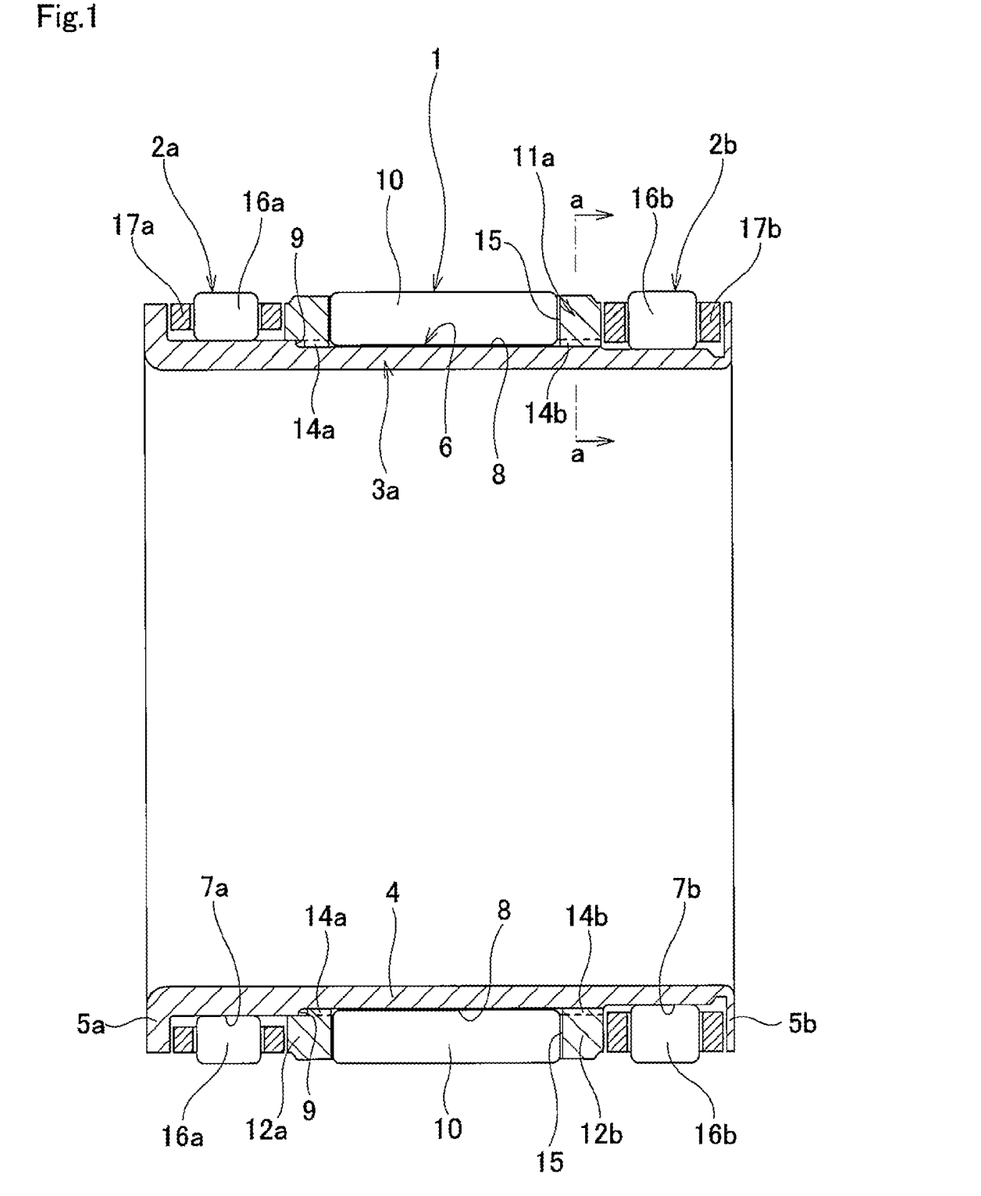
FIG. 1 is a cross-sectional view illustrating a one-way clutch device of a first example of an embodiment of the present invention.
Figure 2:
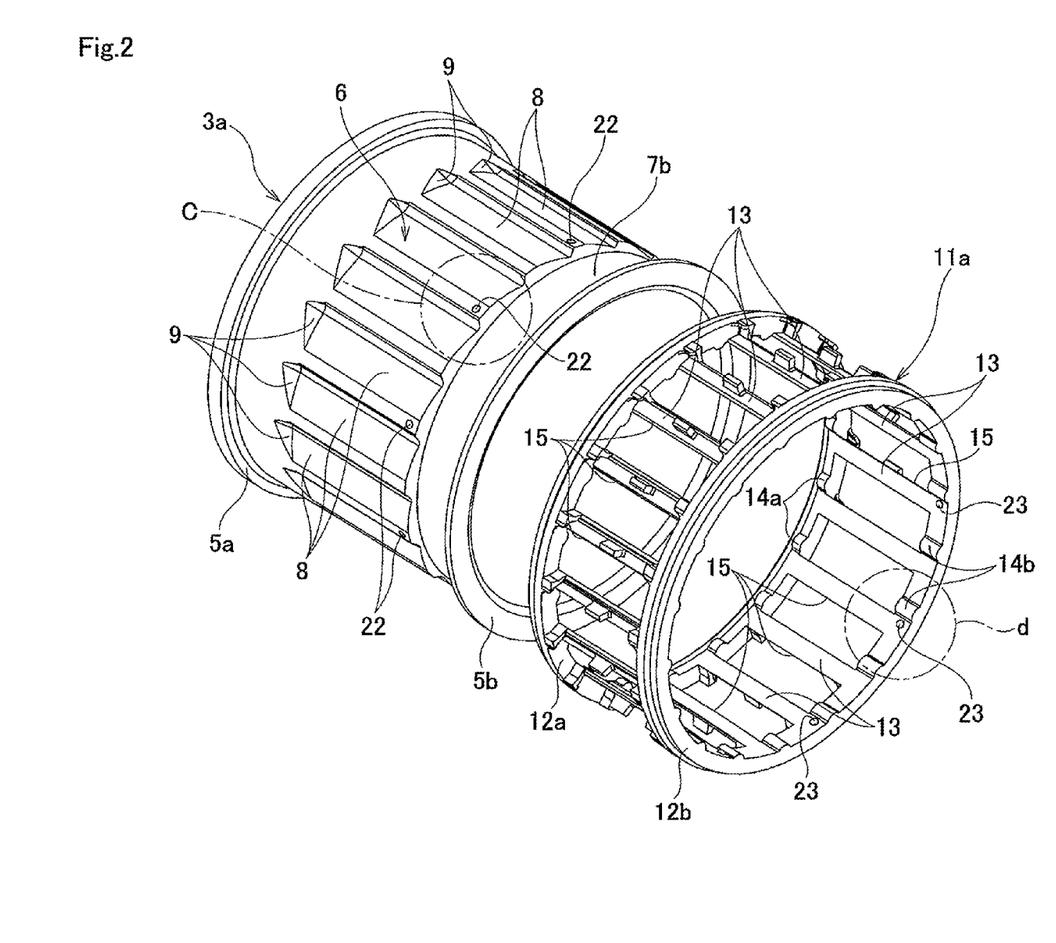
FIG. 2 is an exploded perspective view of an inner ring and clutch retainer of a one-way clutch device of the first example.
Figure 3:
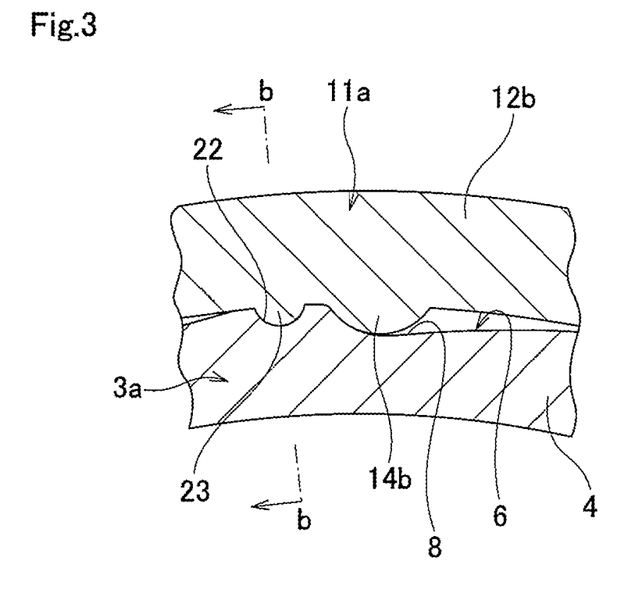
FIG. 3 is an enlarged cross-sectional view of section a-a in FIG. 1.
Figure 4:
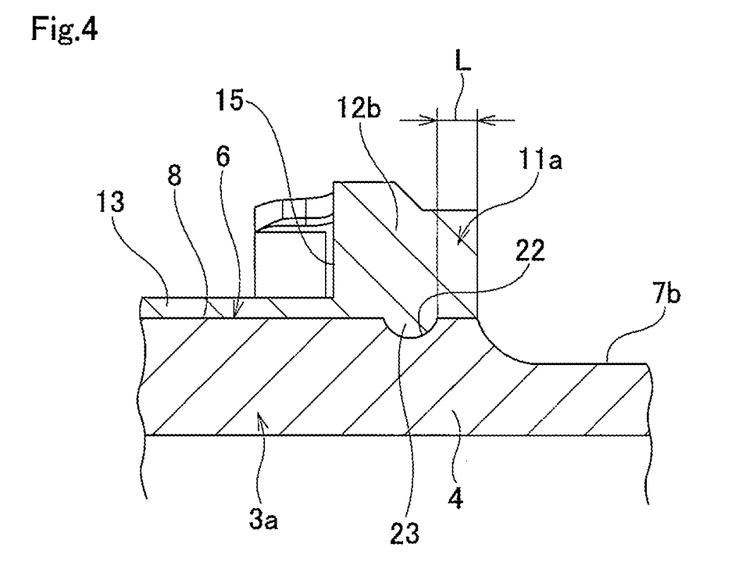
FIG. 4 is a cross-sectional view of section b-b in FIG. 3.
Figure 5:
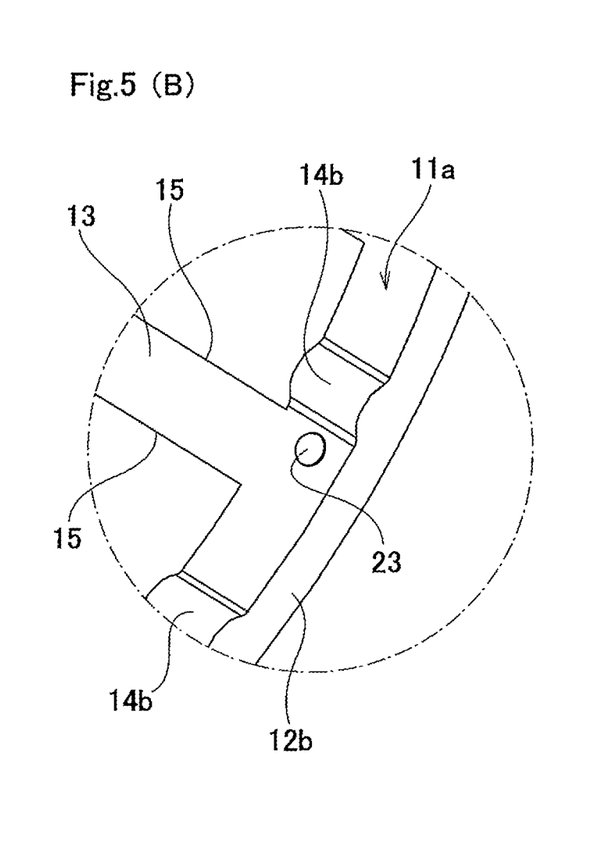
FIG. 5A is an enlarged view of area c in FIG. 2.
FIG. 5B is an enlarged view of area d in FIG. 2.

The plural rollers 10 of the roller clutch 1 are made of metal, and one roller 10 is arranged on the outer-diameter side (perimeter) of each concave cam section 8 of the cam surface 6, which is the inner-diameter-side engaging surface. The clutch retainer 11a is made of synthetic resin such that the entire body is formed into a cylindrical shape, and when holding the plural rollers 10, is arranged around the perimeter of the cam surface 6. The clutch retainer 11a has: a pair of ring shaped rim sections 12a, 12b that are separated in the axial direction and are arrange so as to be concentric with each other; plural column sections 13 that span between the pair of rim sections 12a, 12b, and arranged so as to be separated in the circumferential direction; and plural pockets 15 that are formed in portions that are surrounded on four sides by the pair of rim sections 12a, 12b and column sections 13 of the plural column sections 13 that are adjacent in the circumferential direction, with each pocket 15 holding one roller 10. Each of the rollers 10 is elastically pressed by a spring in the direction in the circumferential direction where the depth of the concave cam sections 8 becomes small.

A feature of this example is that means for restricting displacement in the axial direction of the clutch retainer 11*a* with respect to the inner ring 3*a* is provided between the inner ring 3*a* and clutch retainer 11*a*. The construction and functions of the other parts are the same as those of the one-way clutch device having conventional construction, so duplicate explanations are omitted or simplified, and the following explanation will center on the feature of this example. In the example described below, a one-way clutch device that has a cam-type one-way clutch such as described above is used, however, the present invention can also be applied to a one-way clutch device that has a sprag one-way clutch in which sprags are used as the engaging elements. In that case, the inner-diameter-side engaging surface is a cylindrical surface.

In this example, concave engaging sections 22 are formed at plural locations in the circumferential direction of the other end section in the axial direction of the cam surface 6 of the inner ring 3*a* (right end section in FIG. 1 and FIG. 2) in portions between every other adjacent concave cam section 8 in the circumferential direction. However, the number of locations of concave engaging sections 22 is arbitrary as long as the function of preventing displacement in the axial direction of the clutch retainer 11*a* is obtained, and these concave engaging sections 22 are preferably uniformly spaced in the circumferential direction. In this example, all of the concave engaging sections 22 have a semispherical shape. On the other hand, convex engaging sections 23 are formed at plural locations in the circumferential direction of the inner-circumferential surfaces of the rim section 12*b* on the other side in the axial direction of the clutch retainer 11*a* (right side in FIG. 1 and FIG. 2) that correspond to the concave engaging sections 22. In this example, the convex engaging sections 23 have a semispherical shape that matches the concave engaging sections 22. When the clutch retainer 11*a* is assembled on the outer-diameter side of the cam surface 6, the convex engaging sections 23 firmly fit with the concave engaging sections 22. As a result, displacement in the axial direction of the clutch retainer 11*a* with respect to the inner ring 3*a* is restricted. In this example, the concave engaging sections 22 are formed by pressing with the tip-end section of a punch after the concave cam sections are formed on the outer-circumferential surface of the inner ring 3*a* in a milling process or the like. On the other hand, the convex engaging sections 23 are formed at the same time as performing injection molding of the clutch retainer 11*a*. From the aspect of keeping the amount of additional processing of the inner ring 3*a* to a minimum, the shape of the concave engaging sections is preferably semispherical, however, alternatively, other arbitrary shapes such as an elliptical shape that is long in the circumferential direction can be used as the shape of the concave engaging sections as long as construction is such that displacement in the axial direction of the clutch retainer 11*a* can be prevented, and the width in the axial direction is not large.

In the case of the one-way clutch device of this example, the displacement in the axial direction of the clutch retainer 11*a* with respect to the inner ring 3*a* is restricted due to the engagement between the concave engaging sections 22 and the convex engaging sections 23. Therefore, when assembling the one-way clutch device of this example, the clutch retainer 11*a* that is assembled on the outer-diameter side of the inner ring 3*a* is prevented from accidentally coming out on the other side in the axial direction from the outer-diameter side of the inner ring 3*a* in the stage before forming the other outward-facing flange section 5*b* (right outward-facing flange section in FIG. 1 and FIG. 2). Furthermore, failure to suitably maintain the overrun state of the one-way clutch device due to the bearing retainer 17*b* of the other cylindrical roller bearing 2*b* being strongly sandwiched between the clutch retainer 11*a* and the other outward-facing flange section 5*b* during operation in the overrun state is prevented.

Moreover, the concave engaging sections 22 are formed as semispherical concave sections, so the tip-end surface of the punch that is used for forming the concave engaging sections 22 is a semispherical convex surface that corresponds to the inner surface of the concave engaging sections 22, and has excellent strength. Therefore, even when the diameter of the concave engaging sections 22 is small, it is possible to maintain the durability of the punch. In other words, it is possible to make the diameter of the concave engaging sections 22 small while maintaining the durability of the punch. Therefore, it is possible to keep the amount of processing of the inner ring 3*a* during formation of the concave engaging sections 22 to a minimum, and it is possible to keep the pressing force of the punch small. As a result, it is possible to uses a small device as the device for generating the pressing force of the punch, so it is possible to keep down manufacturing costs by that amount.

Moreover, the width in the circumferential direction on the cam surface 6 of the portions between concave cam sections 8 that are adjacent in the circumferential direction where the concave engaging sections 22 are formed must be kept a specified amount according to the diameter of the concave engaging sections 22. In this regard, in this example, the diameter of the concave engaging sections 22 can be made sufficiently small, so it is not necessary to increase the width in the circumferential direction of the portions between concave cam sections 8 that are adjacent in the circumferential direction when forming the concave engaging sections 22, or even when the width is increased when forming the concave engaging sections 22, it is possible to sufficiently suppress that amount of increase. Moreover, in regard to the diameter of the cam surface 6 as well, it is not necessary to increase the diameter when forming the concave engaging sections 22, or even when the width is increased when forming the concave engaging sections 22, it is possible to sufficiently suppress the amount of increase. On the other hand, the convex engaging sections 23 can be formed at the same time as injection molding of the clutch retainer 11*a*.

The work of assembling the clutch retainer 11*a* on the outer-diameter side of the cam surface 6 is performed by inserting the inner ring 3*a* into the inner-diameter side of the clutch retainer 11*a* from the opening on one end (left end in FIG. 1 and FIG. 2) in the axial direction of the clutch retainer 11*a* in the state before forming the other outward-facing flange section 5*b* on the other end section in the axial direction of the inner ring 3*a*. When doing this, the convex engaging sections 23 elastically ride up onto the portions of the cam surface 6 between concave cam sections 8 that are adjacent in the circumferential direction from the edge on the other end (edge on the right end in FIG. 1 and FIG. 2) in the axial direction of these portions between concave cam sections 8 that are adjacent in the circumferential direction. Then, after sliding and moving in the axial direction over these portions between concave cam sections 8 that are adjacent in the circumferential direction, the convex engaging sections 23 are elastically restored when aligned with the concave engaging sections 22, and fit with the concave engaging sections 22. When the convex engaging sections 23 slide and move in the axial direction over the portions between concave cam sections 8 that are adjacent in the circumferential direction in this way, a large sliding resistance force acts between the convex engaging sections 23 and the portions between concave cam sections 8 that are adjacent in the circumferential direction. However, in this example, the convex engaging sections 23 are only provided on the inner-circumferential surface of the other rim section 12b that is located on the other end section (right end section in FIG. 1 and FIG. 2) in the axial direction of the clutch retainer 11a, and the concave engaging sections 22 are provided on the other end section in the axial direction of the portions between concave cam sections 8 that are adjacent in the circumferential direction, so the sliding distance L (see FIG. 4) where the large sliding resistance force acts is very short. Therefore, it is possible to easily perform the work of inserting the inner ring 3a.

In this example, it is also possible to restrict the displacement in the circumferential direction of the clutch retainer 11a with respect to the inner ring 3a based on the engagement between the concave engaging sections 22 and the convex engaging sections 23. Therefore, it is also possible to eliminate the protrusions 14a, 14b on the inner circumferential surface of the clutch retainer 11a that are separately provided in order to restrict the displacement in the circumferential direction. However, in order to surely restrict the displacement in the circumferential direction of the clutch retainer 11a and to maintain reliability of the one-way clutch, it is preferred that the protrusions 14a, 14b be provided.

Second Example

In this example, a ring-shaped member 24 is fitted and fastened around the outside of the other end section (right end section in FIG. 6 and FIG. 7) in the axial direction of the cam surface 6 of the inner ring 3 with an interference fit at a location facing and adjacent to the surface on the other end in the axial direction (surface on the right end in FIG. 6 and FIG. 7) of the rim section 12b on the other side of the clutch retainer 11. In this example, displacement toward the other side in the axial direction (right side in FIG. 6 and FIG. 7) of the clutch retainer 11 with respect to the inner ring 3 is restricted based on the existence of the ring-shaped member 24.

Therefore, when assembling the one-way clutch device of this example, the ring-shaped member 24 and clutch retainer 11 are assembled around the outer-diameter side of the inner ring 3 in the stage before forming the other outward-facing flange section 5b (right outward-facing flange section in FIG. 6 and FIG. 7), and then after that, the clutch retainer 11 is prevented from accidentally coming out toward the other side in the axial direction from the outer-diameter side of the inner ring 3. Furthermore, during operation in the overrun state, problems such as failure to suitably maintain the overrun state of the one-way clutch device due to the bearing retainer 17b of the other cylindrical roller bearing 2b being strongly sandwiched between the clutch retainer 11 and other outward-facing flange section 5b are prevented. Moreover, in this example, the ring-shaped member 24 is simply fastened around the outside of the outer-circumferential surface of the inner ring 3 with an interference fit. Therefore, there is an advantage in that there is no need to perform additional processing of the inner ring 3 in order to add means for restricting displacement in the axial direction by using a ring-shaped member 24.

Figure 6:
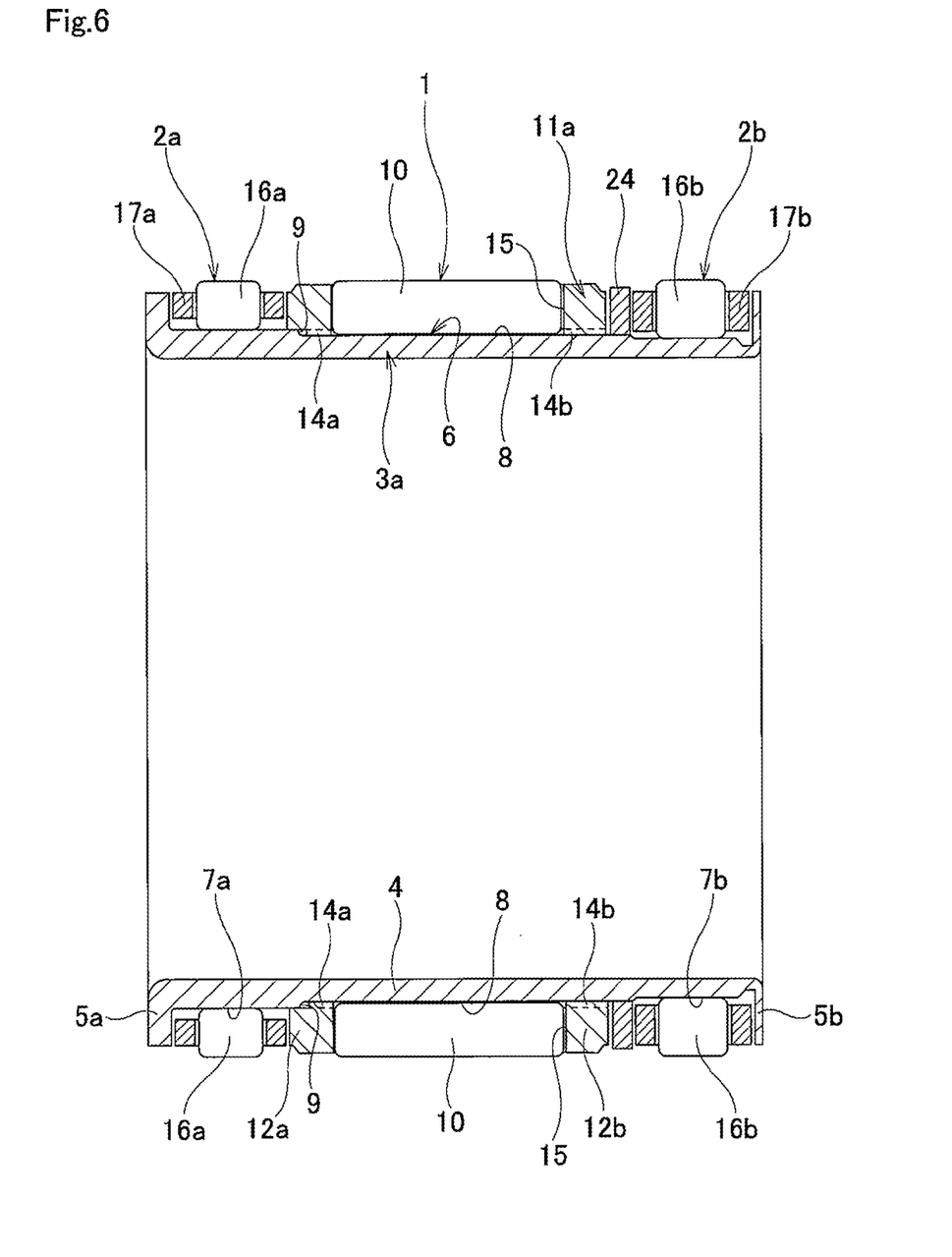
FIG. 6 is a cross-sectional view illustrating a one-way clutch device of a second example of an embodiment of the present invention.
Figure 7:
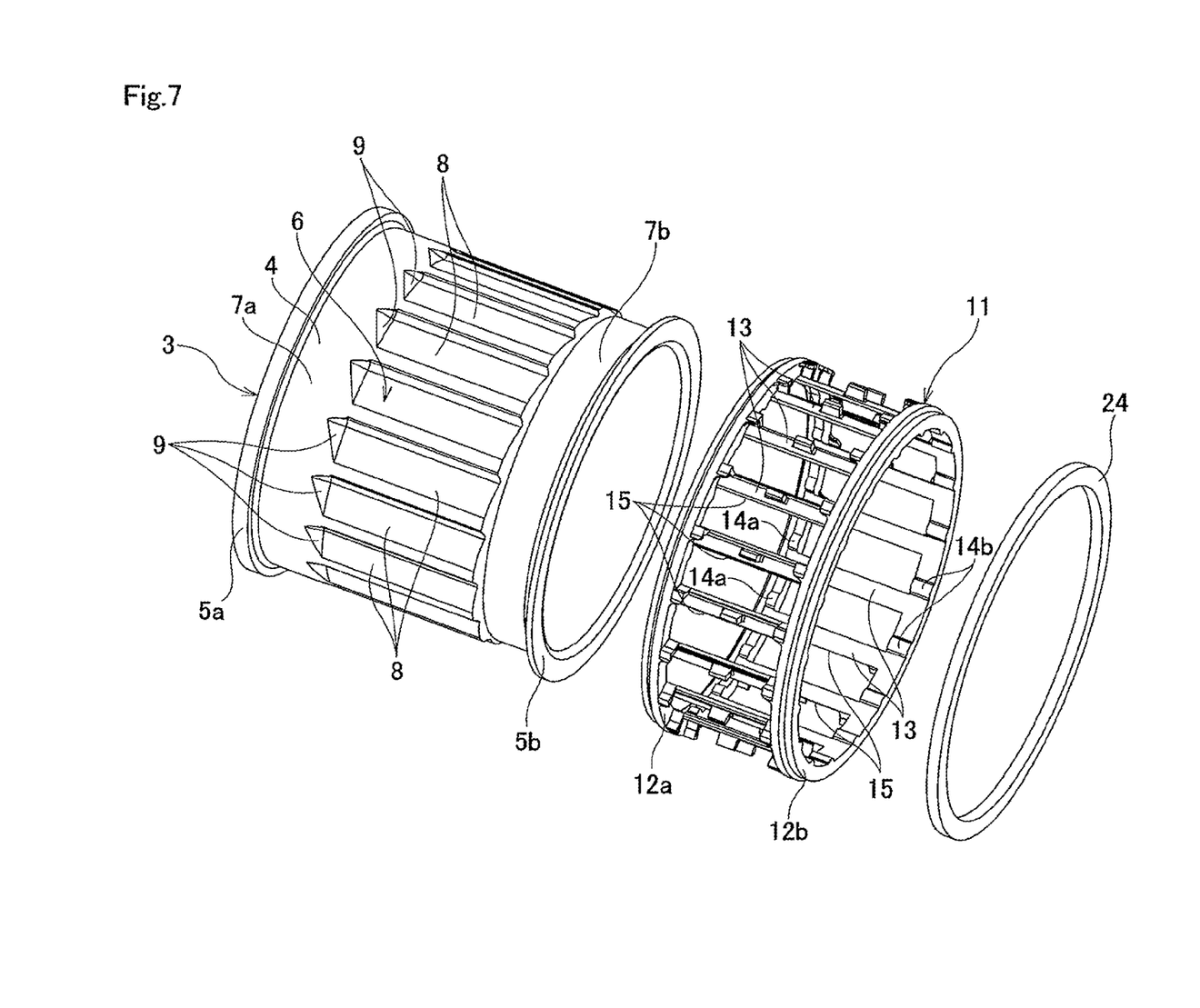
FIG. 7 is an exploded perspective view of an inner ring, a clutch retainer and ring-shaped member of a one-way clutch of a second example.

In this example, the ring-shaped member 24 has a height in the radial direction that is the same as that of the rim section 12b on the other side of the clutch retainer 11, however, it is also possible to employ construction in which notches are provided in part in the axial direction on the inner-diameter side of the rim section on the other side of the clutch retainer so as to have a size and shape capable of housing the ring-shaped member, and the ring-shaped member is arranged so as to face and be adjacent to part of the surface on the other end in the axial direction of the clutch retainer. The construction and function of the other parts are the same as in the first example of an embodiment.

In the embodiments described above, construction was employed in which outward-facing flanges 5a, 5b are provided on both end sections in the axial direction of the inner ring 3a, however, when embodying the present invention, it is also possible to use construction in which one of the outward-facing flanges (for example, 5b) is eliminated. When using such construction, it is possible to restrict the displacement in the axial direction of the bearing retainer on the side of the eliminated outward-facing flange section (for example, bearing retainer 17b) by arranging part of the other member located around the perimeter at a position that faces the surface on the outer end in the axial direction of that bearing retainer during use.

INDUSTRIAL APPLICABILITY

The present invention can be widely applied to a one-way clutch that is assembled in the rotation transmission portion of various mechanical devices such as a starter for an idling-stop vehicle, various kinds of auxiliary devices for an automobile such as an alternator and the like, an oil pump for a transmission, and the like.

EXPLANATION OF REFERENCE NUMBERS

1 Roller clutch
2a, 2b Cylindrical roller bearing
3, 3a Inner ring
4 Cylindrical section
5a, 5b Outward-facing flange section
6 Cam surface
7a, 7b Inner raceway
8 Concave cam section
9 Step section
10 Roller
11, 11a Clutch retainer
12a, 12b Rim section
13 Column section
14a, 14b Protrusion
15 Pocket
16a, 16b Cylindrical roller
17a, 17b Bearing retainer
18 Inner-diameter-side member
19 Outer-diameter-side member
20 Cylindrical surface
21 Outer raceway
22 Concave engaging section
23 Convex engaging section
24 Ring-shaped member

What is claimed is:
1. A one-way clutch device, comprising:
an inner ring made of metal and comprising a cylindrical section that comprises an outer-circumferential surface, a pair of outward-facing flange sections that are provided on both end sections in an axial direction of the cylindrical section, an engaging surface provided in a middle section in the axial direction of the outer-circumferential surface of the cylindrical section, and a pair of inner raceways provided on both end sections in the axial direction of the cylindrical section on both sides of the inner-diameter-side engaging surface of the outer-circumferential surface of the cylindrical section, and the inner-diameter-side engaging surface comprising a cam surface in which plural concave cam sections are formed in the middle section in the axial direction of the outer-circumferential surface of the cylindrical section so as to be uniformly spaced in a circumferential direction;

plural engaging elements located around a perimeter of the inner-diameter-side engaging surface;

a clutch retainer made of synthetic resin and comprising a pair of ring-shaped rim sections that are separated in the axial direction and arranged so as to be concentric with each other, plural column sections that span between the pair of rim sections and are arranged so as to be spaced apart in the circumferential direction, and plural pockets that are formed in portions that are surrounded on four sides by the pair of rim sections and column sections of the plural column sections that are adjacent in the circumferential direction and that hold the engaging elements being located and arranged around the perimeter of the inner-diameter-side engaging surface;

plural cylindrical rollers arranged on an outer-diameter side of the pair of inner raceways; and a pair of bearing retainers arranged on the outer-diameter side of the pair of inner raceways, and holding the cylindrical rollers;

wherein one inner raceway of the pair of inner raceways that is located on one side in the axial direction has an outer diameter that is equal to or greater than a diameter of a circumscribed circle of the inner-diameter-side engaging surface, and another inner raceway of the pair of inner raceways that is located on another side in the axial direction has an outer diameter that is equal to or less than a diameter of an inscribed circle of the inner-diameter-side engaging surface;

one outward-facing flange section of the pair of outward-facing flange sections that is located on the one side in the axial direction has a thickness dimension that is equal to a portion of the cylindrical section that is adjacent to where the one inner raceway is provided, and another outward-facing flange section of the pair of outward-facing flange sections that is located on the other side in the axial direction is thinner than a portion of the cylindrical section that is adjacent to where the other inner raceway is provided, and is formed around a perimeter of the cylindrical section after the engaging elements, the clutch retainer, the cylindrical rollers and the bearing retainers have been arranged; and means are provided between the inner ring and the clutch retainer for restricting displacement in the axial direction of the clutch retainer with respect to the inner ring, wherein the means for restricting the displacement in the axial direction of the clutch retainer comprises concave engaging sections that are formed in portions between concave cam sections of the plural concave cam sections that are adjacent in the circumferential direction, and convex engaging sections that are formed on the inner-circumferential surface of at least one rim section of the pair of rim sections and have a shape engageable with the concave engaging sections, and engagement between the concave engaging sections and the convex engaging sections prevents the displacement in the axial direction of the clutch retainer.

2. The one-way clutch device according to claim 1, wherein
the concave engaging sections have a circular shape as seen from a radial direction, and have an inner surface comprising a concave surface, and the convex engaging sections have a semispherical shape.

3. The one-way clutch device according to claim 1, wherein
the engaging elements comprise plural rollers that are arranged so that one roller is located on an outer-diameter side of each concave cam section.

4. A one-way clutch device comprising:
an inner ring made of metal and comprising: a cylindrical section that comprises an outer-circumferential surface, a pair of outward-facing flange sections that are provided on both end sections in an axial direction of the cylindrical section, an engaging surface provided in a middle section in the axial direction of the outer-circumferential surface of the cylindrical section, and a pair of inner raceways provided on both end sections in the axial direction of the cylindrical section on both sides of the inner-diameter-side engaging surface of the outer-circumferential surface of the cylindrical section, and the inner-diameter-side engaging surface comprising a cam surface in which plural concave cam sections are formed in the middle section in the axial direction of the outer-circumferential surface of the cylindrical section so as to be uniformly spaced in a circumferential direction;

plural engaging elements located around a perimeter of the inner-diameter-side engaging surface;

a clutch retainer made of synthetic resin and comprising: a pair of ring-shaped rim sections that are separated in the axial direction and arranged so as to be concentric with each other, plural column sections that span between the pair of rim sections and are arranged so as to be spaced apart in the circumferential direction, and plural pockets that are formed in portions that are surrounded on four sides by the pair of rim sections and column sections of the plural column sections that are adjacent in the circumferential direction and that hold the engaging elements and arranged around a perimeter of the inner-diameter-side engaging surface;

plural cylindrical rollers arranged on an outer-diameter side of the pair of inner raceways; and a pair of bearing retainers arranged on the outer-diameter side of the pair of inner raceways, and holding the cylindrical rollers;

wherein one inner raceway of the pair of inner raceways that is located on one side in the axial direction has an outer diameter that is equal to or greater than a diameter of a circumscribed circle of the inner-diameter-side engaging surface, and another inner raceway of the pair of inner raceways that is located on another side in the axial direction has an outer diameter that is equal to or less than a diameter of an inscribed circle of the inner-diameter-side engaging surface;

one outward-facing flange section of the pair or outward-facing flange sections that is located on one side in the axial direction has a thickness dimension that is equal to a portion of the cylindrical section that is adjacent to where the one inner raceway is provided, and another outward-facing flange section of the pair of outward-facing flange sections that is located on the other side in the axial direction is thinner than a portion of the cylindrical section that is adjacent to where the other inner raceway is provided, and is formed around a perimeter of the cylindrical section after the engaging elements, the clutch retainer, the cylindrical rollers and the bearing retainers have been arranged; and means are provided between the inner ring and the clutch retainer for restricting displacement in the axial direction of the clutch retainer with respect to the inner ring, wherein the means for restricting the displacement in the axial direction of the clutch retainer comprises a ring-shaped member that is fastened with an interference fit around an outside of the inner ring at a position that is adjacent to and faces at least one end surface of the both end surfaces in the axial direction of the clutch retainer; and engagement between the ring-shaped member and the at least one end surface of the clutch retainer prevents the displacement in the axial direction of the clutch retainer.

5. The one-way clutch device according to claim 4, wherein the engaging elements comprise plural rollers that are arranged so that one roller is located on an outer-diameter side of each concave cam section.

* * * * *